US009241115B2

(12) United States Patent
Owens et al.

(10) Patent No.: US 9,241,115 B2
(45) Date of Patent: Jan. 19, 2016

(54) INFRARED SCENE PROJECTOR

(75) Inventors: William R. Owens, Tucson, AZ (US);
Delmar L. Barker, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 406 days.

(21) Appl. No.: 13/532,913

(22) Filed: Jun. 26, 2012

(65) Prior Publication Data

US 2013/0341535 A1    Dec. 26, 2013

(51) Int. Cl.
*B82Y 10/00*     (2011.01)
*H04N 5/33*      (2006.01)
*H04N 5/225*     (2006.01)
*B82Y 20/00*     (2011.01)
*B82Y 30/00*     (2011.01)

(52) U.S. Cl.
CPC *H04N 5/33* (2013.01); *B82Y 20/00* (2013.01); *H04N 5/2256* (2013.01); *B82Y 10/00* (2013.01); *B82Y 30/00* (2013.01); *H01J 2201/30469* (2013.01)

(58) Field of Classification Search
CPC ............ H01J 2201/30469; B82Y 10/00
USPC ............ 353/122; 977/949; 250/459.1, 504 H
See application file for complete search history.

(56) References Cited

U.S. PATENT DOCUMENTS

2007/0103048 A1*  5/2007  Liu et al. ............... 313/311
2008/0157652 A1*  7/2008  Li et al. ............... 313/496
2010/0110308 A1*  5/2010  Nicholson et al. ........ 348/744
2013/0048884 A1*  2/2013  Fainchtein et al. ...... 250/495.1

OTHER PUBLICATIONS

Carbon Nanotube Black Body, nano tech 2009, [retrieved on Jun. 26, 2012]. p. 13. Retrieved from the internet:,URL:http://www.aist.go.jp/aist_e/search/aist_google_search_e.html?cx=004983608496508821980%3Aavdsyoeo0bu&cof=FORID%3A10&ie=ISO-8859-1&q=carbon+nanotube+black+body&sa=Search.
Zhang, et al. "Strong Transparent, Multifunctional, Carbon Nanotube Sheets" Science, vol. 309, Aug. 19, 2005. pp. 1215-1219.

* cited by examiner

*Primary Examiner* — William C Dowling
*Assistant Examiner* — Ryan Howard
(74) *Attorney, Agent, or Firm* — Cantor Colburn LLP

(57) ABSTRACT

An apparatus for displaying a scene with light in a range of infrared wavelengths, includes: an array of elements configured to emit light in a range of infrared wavelengths, each element having one or more nanotubes; a stimulator configured to apply a stimulus to each element in the array in order for each element to emit light in the range of infrared wavelengths; and a processor configured to send a signal to the stimulator in order to apply the stimulus to one or more selected elements in the array to display the scene.

14 Claims, 7 Drawing Sheets

INFRARED SCENE PROJECTOR

BACKGROUND

The present disclosure relates generally to displays and, more particularly, to displays generating scenes with electromagnetic radiation in a range of infrared wavelengths.

Infrared imagining sensors image form an image of received light in a range of infrared wavelengths. Calibration and testing of an infrared imaging sensor requires simulated infrared imagery or scenes in real time. Typically, the infrared imagery or scenes are dynamic and depict movement, thus, requiring rapid imaging of many consecutive still scenes that will depict the movement. In general, increasing the rate of image acquisition by the imaging sensor will increase the accuracy of imaging the movement. Accordingly, an infrared scene simulator or display may be required to display scenes or images in a range of infrared wavelengths at a refresh rate that is compatible with the image acquisition rate of the infrared imaging sensor.

Generating infrared scenes depicting movement using conventional techniques has proven to be a challenge. A typical manner of providing such scenes involves heating and cooling resistive elements in an array to provide infrared irradiance. Unfortunately, the thermal inertia of these elements limits the rate at which the scene can be refreshed and often results in artifacts in the scene. In addition, the resistive elements do not produce true infrared spectrums. The limited refresh rate and spectrum in addition to artifact introduction can consequently interfere with the calibration and testing. Hence, improvements in displays for displaying infrared dynamic scenes would be well appreciated in the infrared imaging sensor industry.

SUMMARY

Disclosed in an apparatus for displaying a scene with light in a range of infrared wavelengths. The apparatus includes: an array of elements configured to emit light in a range of infrared wavelengths, each element having one or more nanotubes; a stimulator configured to apply a stimulus to each element in the array in order for each element to emit light in the range of infrared wavelengths; and a processor configured to send a signal to the stimulator in order to apply the stimulus to one or more selected elements in the array to display the scene.

Also disclosed is an apparatus for imaging light within a range of infrared wavelengths. The apparatus includes: an infrared imager configured to image light within a range of infrared wavelengths; an array of elements configured to emit light in a range of infrared wavelengths, each element having one or more nanotubes; a stimulator configured to apply a stimulus to each element in the array in order for each element to emit light in the range of infrared wavelengths; and a processor configured to send a signal to the stimulator in order to apply the stimulus to one or more selected elements in the array to display a scene for imaging by the infrared imager.

Further disclosed is a method for displaying a scene with light in a range of infrared wavelengths. The method includes: selecting an array of elements configured to emit light in a range of infrared wavelengths, each element having one or more nanotubes; and applying a stimulus to one or more selected elements in the array using a stimulator in order for the one or more selected elements to emit light in the range of infrared wavelengths to display the scene.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method is presented herein by way of exemplification and not limitation with reference to the Figures.

Disclosed are embodiments of apparatus and method for displaying a known infrared image or moving scene to an infrared imager. The known infrared image or moving scene can then be used to calibrate or test the infrared imager or a processor configured to process the obtained image for various purposes.

Figure 1:
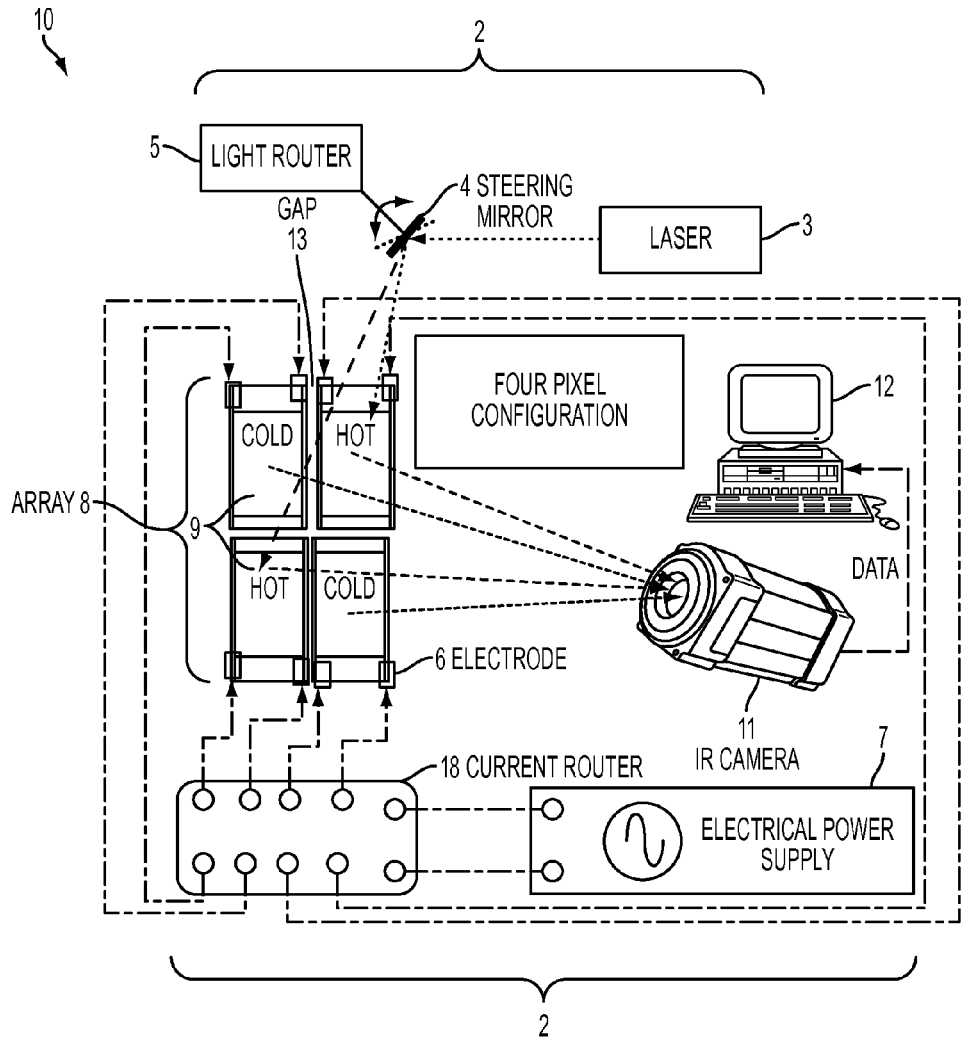
FIG. 1 is an exemplary embodiment of a display system for displaying dynamic scenes in a range of infrared wavelengths.
Figure 2:
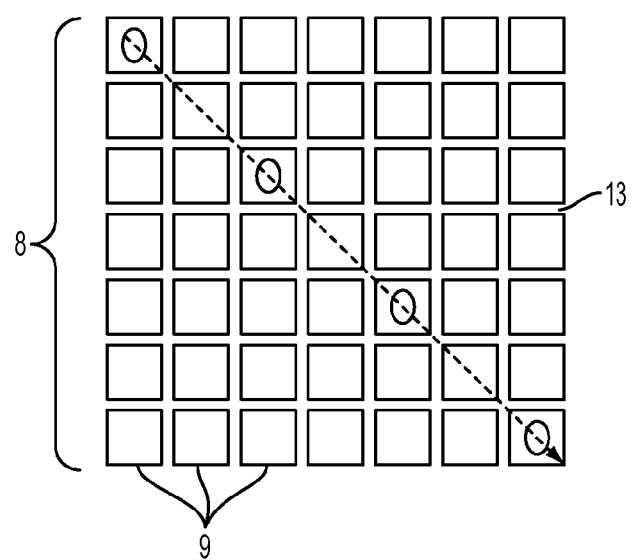
FIG. 2 depicts aspects of a dynamic scene.

FIG. 1 illustrates an exemplary embodiment of a system 10 for displaying a scene with light in a range of infrared wavelengths. The system 10 includes an array 8 of elements 9 configured to emit light in a range of infrared wavelengths where each element 9 in the array 8 has one or more nanotubes. The elements 9 may be considered pixels (such as in a television or computer display) that when stimulated emit light in a range of infrared wavelengths to form an image or scene. By sequentially generating images, movement may be depicted. Hence, a displayed scene may be static or dynamic showing movement. The array 8 illustrated in FIG. 1 is 2×2 for teaching purposes. The size of the array 8 can be much larger and is selected to provide a desired image size and resolution. In the embodiment of FIG. 1, a gap 13 separates adjacent elements 9 from each other. As illustrated in FIG. 2, simulated motion of an object in a lower right diagonal direction can be displayed by sequentially stimulating elements 9 along the lower right diagonal direction.

Referring back to FIG. 1, a stimulator 2 is configured to stimulate each of the elements 9 in the array 8 in order to cause each of the elements 9 to emit light in a range of infrared wavelengths. The term "infrared wavelengths" relates to light within a range of about 750 nanometers (nm) to about 1 millimeter (mm). The stimulator 2 is configured to heat (i.e., apply a stimulus) to one or more nanotubes in each element 9. In one or more embodiments, the nanotubes are carbon nanotubes that are black bodies, which absorb all or nearly all light that they receive. The nanotubes then radiate absorbed energy as light in a range of infrared wavelengths according to a Planck Spectrum for the temperature of the nanotubes. In one or more embodiments, the stimulator 2 is configured to heat each element 9 by applying electric current via one or more electrodes 6 coupled to each of the elements 9 as illustrated in FIG. 1. The electric current heats each element to which the electric current is applied to a certain temperature. The heated elements 9 in turn radiate heat as infrared light according to a Planck Spectrum for that certain temperature. An electrical power supply 7 is configured to supply electrical current to a current router 18. The current router 18 is configured to determine which of the elements 9 to apply electric current to in order to create a known infrared image, which may simulate an object, and to route the electric current to those elements 9. Creating several sequential images can be used to simulate movement of the object. The current router 18 may include a processor and electronic switches to quickly route the electric current.

The stimulator 2 in one or more alternative embodiments includes a laser 3, a steering mirror 4, and a light router 5 as illustrated in FIG. 1. The light router 5 is configured to determine which of the elements 9 to apply a stimulus to in order to create a known infrared image, which may simulate an object. Creating several sequential images can be used to simulate movement of the object. Light from the laser 3 is steered or directed to one or more elements 9 that are selected to emit infrared light to create the infrared image. The light is steered by the steering mirror 4, which is controlled, such as by being rotated, by the light router 5. The laser light impinging on (or illuminating) each element 9 heats that element 9 to a certain temperature. That element 9 in turn radiates heat as infrared light according to a Planck Spectrum for that certain temperature. In one or more embodiments, the laser 3 may include a plurality of lasers in order to improve the refresh rate of the projected scene.

Still referring to FIG. 1, an infrared imager 11, such as an infrared camera, receives the still or moving image. A computer processing system 12 is configured to process the still or moving image imaged by the infrared imager 11. Hence, the infrared imager 11, the computer processing system 12, or an algorithm executed by the computer processing system 12 may be calibrated or tested using known still or moving images as a reference standard.

It can be appreciated that the light router 5 and/or the current router 18 may include analog or digital processing systems that may include analog or digital processors, respectively, to provide control capability. In addition, the light router 5 and/or the current router 18 may be configured to receive known moving images simulating movement of an object and to determine which of the elements 9 will be required to be stimulated in order to recreate the moving images. In one or more embodiments, the known moving images may be provided by a computer processing system such as the computer processing system 12.

Figure 3:
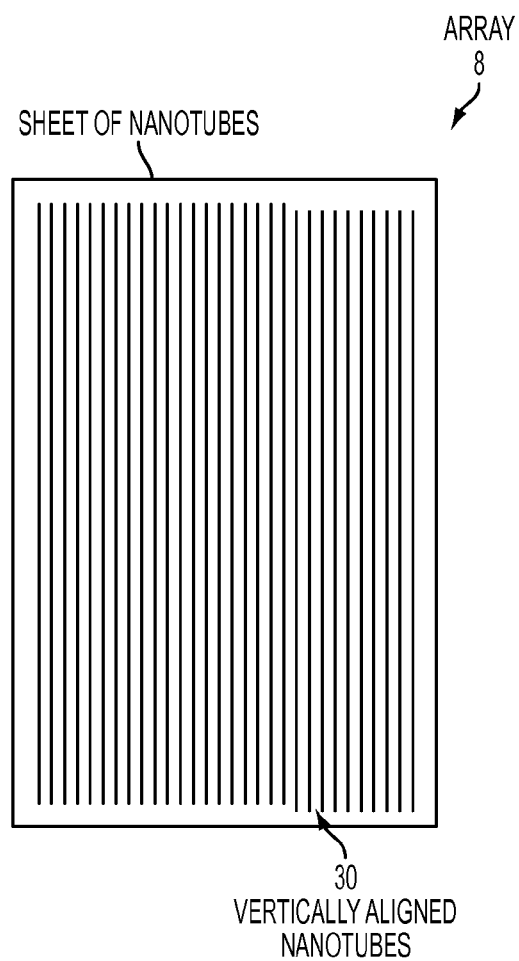
FIG. 3 depicts aspects of a thin sheet of nanotubes configured to project a still or moving scene.

In one or more embodiments, the array 8 of elements 9 is fabricated as a thin sheet or ribbon of aligned (i.e., parallel to each other) or partially aligned (i.e., some are parallel to each other) carbon nanotubes such as multiwalled nanotubes. FIG. 3 illustrates a front view of a sheet of nanotubes 30. The nanotubes in this embodiment are aligned vertically. The term "thin" relates to the sheet or ribbon of nanotubes having a thickness of approximately 50 nanometers, although the sheet or ribbon can be thicker or thinner depending on a required radiation cooling rate. Thinner sheets have less mass and, therefore, have a higher radiation cooling rate than thicker sheets having a higher mass. The frequency at which the displayed scene can be updated depends of the radiation cooling rate where the higher radiation cooling rate enables a higher scene update frequency. Hence, the thickness of the sheet and thus the related mass of the sheet are selected to provide a desired scene or image update or refresh frequency. In one or more embodiments, the array 8 may be formed by physically separating adjacent elements 9 by providing the gap 13 between each element 9. The gap 13 limits thermal conduction between nearby elements 9 and, thus, limiting unwanted infrared emission from the nearby elements 9.

Alternatively, the nanotubes 30 may be evenly disposed on the sheet without any gaps 13. In this alternative embodiment, each element 9 can be defined spatially and the defined space heated to cause that element 9 to emit infrared (IR) electromagnetic radiation. In general, the sheet of nanotubes 30 is transparent to IR light such that IR light emitted by the nanotubes or IR light from another source can pass through the sheet.

An advantage to using the sheet of nanotubes as the array 8 of elements 9 as an infrared display is that the small mass (and therefore small thermal mass) of the nanotubes allows very rapid heating and cooling. Heat and cooling cycles may be up to at least $10^4$ Hz, thus allowing rapid infrared scene generation rates (i.e., formation of rapidly changing infrared images) of up to at least $10^4$ Hz. The term "rapid" relates to infrared scene generation rates and heating/cooling cycle times of up to at least $10^4$ Hz. The rapid cycle time along with a true Planck Spectrum provides for generating dynamic scenes having high fidelity (i.e., accurately depicting movement requiring rapid infrared scene generation) to enable accurate calibration and testing. In addition, calibration and testing may be performed in a reduced amount of time, thus, reducing calibration and test labor. Another advantage to using the sheet of nanotubes is that they are transparent at infrared wavelengths, but much less transparent at visible wavelengths (e.g., 90% transparent versus 50% transparent). Another advantage to using the sheet of nanotubes is that the nanotubes can be heated to a wide range of temperatures and emit infrared light according to the Planck Spectra corresponding to those temperatures. For example, the nanotubes can be heated from 300° K to 1300° K in air, to 2500° K in Argon, and even higher in a vacuum. Yet, another advantage is the emitted light may be highly polarized and may be used for calibration and testing with scenes requiring polarized infrared light.

One aspect of the elements 9 is that they provide an adequate signal or light intensity level that is necessary for calibrating and testing the imager 11 and/or algorithm executed by the computer processing system 12. Calculations were performed for a pixel (i.e., element 9) having an area of $3.52 \times 10^{-4}$ m². For element temperatures from 300° K to 1400° K, the calculations show that the modeled element emits electromagnetic radiation in wavelengths in the range of 7 to 8 microns having radiance from $2.6 \times 10^{-4}$ to $1,232 \times 10^{-4}$ Watts per steradian (sr), respectively for that temperature range.

Figure 4:
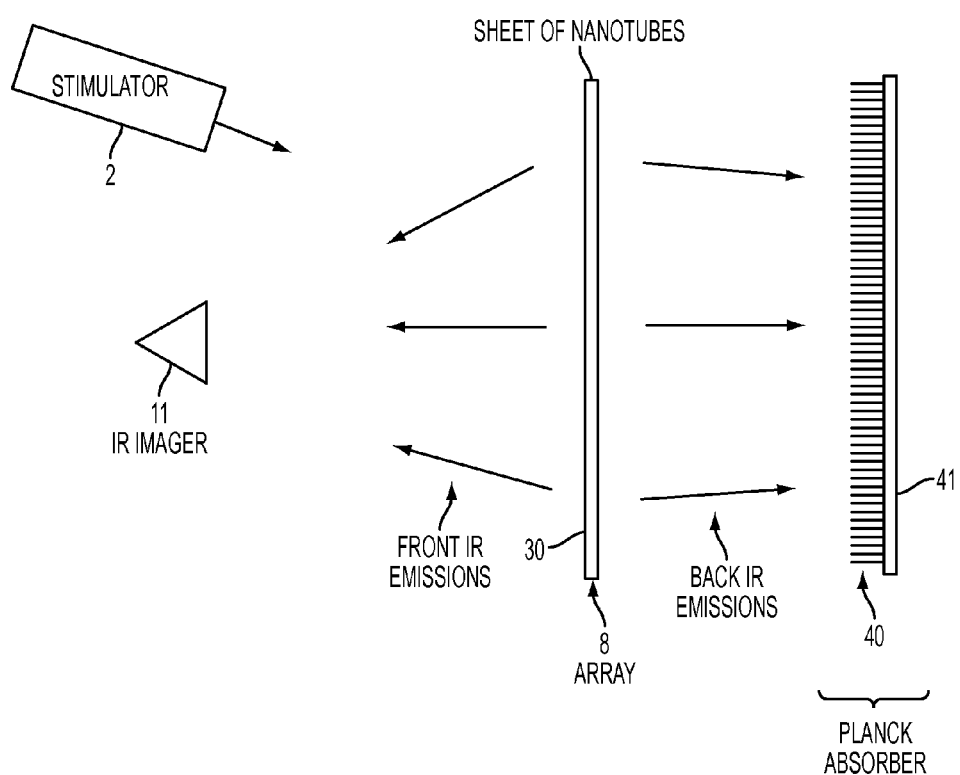
FIG. 4 depicts aspects of a Planck absorber to prevent reflections from the display.

In certain situations, infrared light emitted from the elements 9 in a direction opposite of the direction to the infrared imager 11 may interfere with calibration and testing or may be unwanted for other reasons. In these situations, a sheet of absorber nanotubes 40, which can absorb light over wide range of wavelengths, can be placed behind the array 8 of elements 9 (i.e., on a side of the array 8 opposite from the imager 11) as illustrated in a side-view in FIG. 4. In one or more embodiments, the sheet of absorber nanotubes 40 has the plurality of nanotubes 40 extending from a substrate 41. The nanotubes 40 may be normal or approximately normal to the substrate 41 and may be referred to as a "forest of nanotubes."

Figure 5:
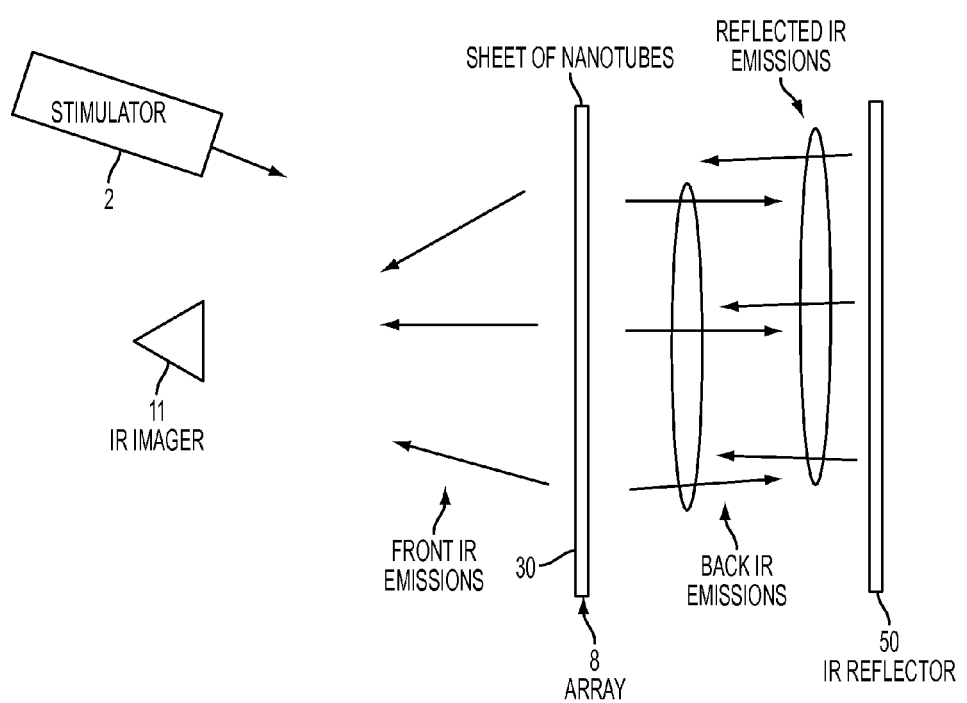
FIG. 5 depicts aspects of an infrared reflector to increase the intensity of infrared light emitted by the display.

In certain situations, it may be desirable to increase the intensity of the infrared light emitted by the elements 9 in the direction of the infrared imager 11 over the intensity of infrared light that would normally be emitted in that direction. For example, the elements 9 may emit a weak signal (i.e., weak light output) if they are only heated to a lower temperature. In these situations, to increase the signal output, a reflector 50 can be placed can be placed behind the array 8 of elements 9 as illustrated in a side-view in FIG. 5. The reflector 50 is configured to reflect received infrared light in a direction toward the infrared imager 11. In one or more embodiments, the reflector 50 is a metal mirror such as a gold mirror.

Figure 6:
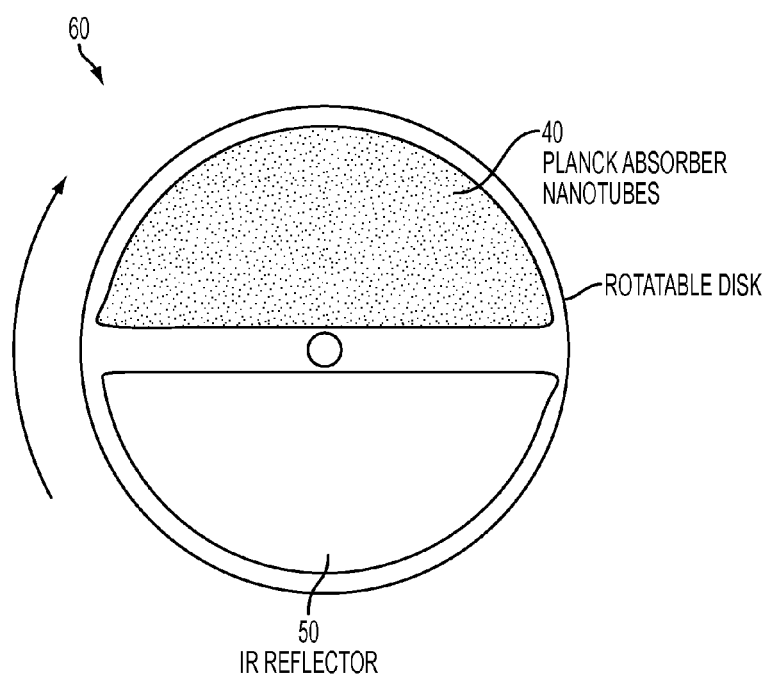
FIG. 6 depicts aspects of a switchable device for switching between the Planck absorber and the reflector.

In one or more embodiments, the sheet of absorber nanotubes 40 may be combined with the reflector 50 in a switchable device 60 as illustrated in a front-view in FIG. 6. The switchable device 60 is actuated and controlled by a controller 61, which is configured to place either the sheet of absorber nanotubes 40 or the reflector 50 behind the array 8 of elements 9 depending on requirements. In one or more embodiments, the sheet of absorber nanotubes 40 and the reflector 50 are disposed on different sections of a rotatable disk. Hence, by rotating the disk, the desired material can be placed behind the array 8.

It can be appreciated that a layer of aligned nanotubes, such as the layer illustrated in FIG. 3, may be joined to another layer of nanotubes having a different angle of alignment of the nanotubes to fabricate a sheet of nanotubes having a rigid self-supporting structure. Further layers of nanotubes may also be joined to increase structural rigidity and/or mass. In one or more embodiments, alternating layers have nanotube alignments that are orthogonal to each other or different from each other.

It can be appreciated that when a sheet of nanotubes (i.e., a first sheet) having only one alignment emits infrared light, the emitted light will be polarized according to the alignment. If a second sheet of nanotubes also having only one alignment is placed behind or in front of the first sheet with the two alignments being orthogonal to each other, the combined emitted light will unpolarized. If one sheet is rotated with respect to the other sheet, then the combined emitted light will have varying degrees of polarization. Hence, a rotational device controlled by a controller may be used to rotate the first sheet of nanotubes and/or the second sheet of nanotubes to provide infrared light having a desired polarization.

Figure 7:
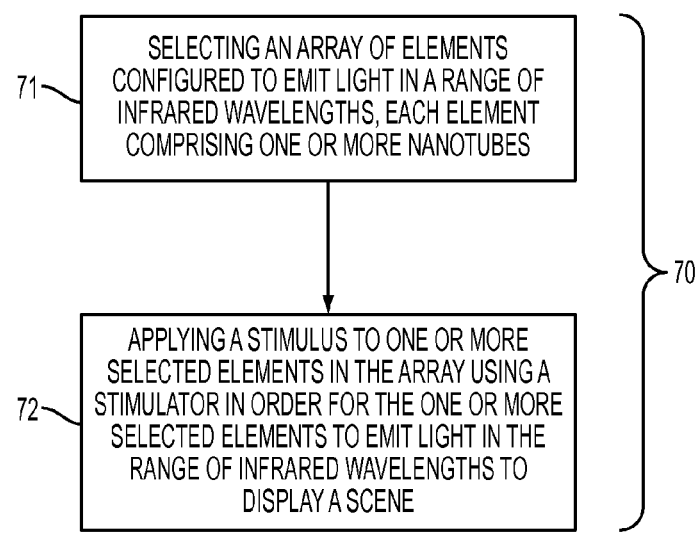
FIG. 7 is a flow chart of a method for displaying a scene with light in a range of infrared wavelengths.

FIG. 7 is a flow chart illustrating a method 70 for displaying a scene with light in a range of infrared wavelengths. Block 71 calls for selecting an array of elements configured to emit light in a range of infrared wavelengths, each element comprising one or more nanotubes. In one or more embodiments, each element in the array emits infrared light when heated to a certain temperature. The infrared light is emitted in accordance with the Planck Spectrum for that certain temperature. Block 72 calls for applying a stimulus to one or more selected elements in the array using a stimulator in order for the one or more selected elements to emit light in the range of infrared wavelengths to display the scene. In one or more embodiments, applying a stimulus relates to heating the one or more selected elements to the certain temperature at which the one or more selected elements emit infrared light in accordance with the Planck Spectrum for that certain temperature. Heating can be performed by illuminating each of the one or more selected elements with laser light, by conducting electric current through each of the one or more selected elements, or by a combination thereof.

It can be appreciated that the light router 5, the current router 18, and/or the computer processing system 12 may include may include various computer devices such as a processor, memory, communications link, input/output interfaces such as a network interface, display, keyboard and mouse, and a non-transitory computer-readable medium that may include computer-executable instructions. These instructions may provide for equipment operation, control, data collection and analysis and other functions deemed relevant by a system designer, owner, user or other such personnel, in addition to the functions described herein.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "couple" relates to one component being coupled either directly to another component or indirectly to the another component via one or more intermediate components.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for displaying a scene with light in a range of infrared wavelengths, the apparatus comprising:
    an array of elements configured to emit light in a range of infrared wavelengths, each element comprising one or more nanotubes, wherein the one or more nanotubes are configured to emit light in the range of infrared wavelengths;
    a stimulator configured to apply a stimulus to each element in the array in order for each element to emit light in the range of infrared wavelengths, wherein the stimulator comprises an electrode coupled to each element and an electric current router configured to route electric current to the electrode of one or more selected elements in the array to display the scene; and
    a processor configured to send a signal to the stimulator in order to apply the stimulus to one or more selected elements in the array to display the scene.

2. The apparatus according to claim 1, wherein the scene comprises multiple scenes that depict movement.

3. The apparatus according to claim 1, wherein the array of elements comprises a first sheet of nanotubes, the first sheet comprising a first side and a second side.

4. The apparatus according to claim 3, further comprising a second sheet of nanotubes facing the second side of the first sheet of nanotubes, the second sheet being configured to absorb light in the range of infrared wavelengths emitted by the first sheet of nanotubes.

5. The apparatus according to claim 3, further comprising a reflector facing the second side and configured to reflect the light emitted in the range of infrared wavelengths emitted by the first sheet of nanotubes.

6. The apparatus according to claim 3, further comprising a switchable device having (i) a first section comprising a second sheet of nanotubes facing the second side of the first sheet of nanotubes, the second sheet being configured to absorb light in the range of infrared wavelengths emitted by the first sheet of nanotubes and (ii) a second section comprising a reflector facing the second side and configured to reflect the light emitted in the range of infrared wavelengths emitted by the first sheet of nanotubes, wherein the switchable device is configured to place one of the first section and the second section to face the second side of the first sheet of nanotubes.

7. The apparatus according to claim 3, wherein the one or more nanotubes comprise carbon nanotubes.

8. The apparatus according to claim 3, wherein the one or more nanotubes are in a plane of a sheet.

9. The apparatus according to claim 8, wherein the one or more nanotubes comprise a plurality of nanotubes and two or more of the nanotubes in the plurality are aligned parallel to each other.

10. An apparatus for imaging light within a range of infrared wavelengths, the apparatus comprising:
    an infrared imager configured to image light within a range of infrared wavelengths;
    an array of elements configured to emit light in a range of infrared wavelengths, each element comprising one or more nanotubes, wherein the one or more nanotubes are configured to emit light in the range of infrared wavelengths;
    a stimulator configured to apply a stimulus to each element in the array in order for each element to emit light in the range of infrared wavelengths, wherein the stimulator comprises an electrode coupled to each element and an electric current router configured to route electric current to the electrode of one or more selected elements in the array to display the scene; and
    a processor configured to send a signal to the stimulator in order to apply the stimulus to one or more selected elements in the array to display a scene for imaging by the infrared imager.

11. A method for displaying a scene with light in a range of infrared wavelengths, the method comprising:
    selecting an array of elements configured to emit light in a range of infrared wavelengths, each element comprising one or more nanotubes, wherein the one or more nanotubes are configured to emit light in the range of infrared wavelengths; and
    applying a stimulus to one or more selected elements in the array using a stimulator in order for the one or more selected elements to emit light in the range of infrared wavelengths to display the scene;
    wherein applying a stimulus comprises routing electric current to the one or more selected elements in the array using an electrode coupled to the one or more selected elements and an electric current router to display the scene.

12. The method according to claim 11, wherein the scene comprises multiple scenes that depict movement.

13. The method according to claim 11, further comprising absorbing emitted light in the range of infrared wavelengths in a spatial region using a sheet of nanotubes having the nanotubes extending from a substrate.

14. The method according to claim 11, further comprising reflecting emitted light in the range of infrared wavelengths in a spatial region using a reflector in order to increase a total amount of light used to display the scene.

* * * * *